United States Patent [19]
Brown

[11] 3,974,801
[45] Aug. 17, 1976

[54] OSCILLATING PISTON INTERNAL COMBUSTION ENGINE

[76] Inventor: Jesse C. Brown, 307 Walter Ave., Delanco, N.J. 08075

[22] Filed: Apr. 3, 1975

[21] Appl. No.: 564,782

[52] U.S. Cl. .......................... 123/18 R; 123/43 R; 123/61 R; 123/58 R; 92/56; 92/67; 92/68
[51] Int. Cl.² .................................. F02B 53/00
[58] Field of Search ............. 123/43 R, 61 R, 58 R, 123/18 R, 18 A; 74/84; 92/56, 57, 66, 68, 69, 67

[56] References Cited
UNITED STATES PATENTS

| | | | |
|---|---|---|---|
| 736,151 | 8/1903 | Primat | 123/18 A |
| 1,094,794 | 4/1914 | Kemper et al. | 123/18 R |
| 1,216,160 | 2/1917 | Paige | 123/43 R |
| 1,400,255 | 12/1921 | Anderson | 123/8.45 |
| 1,511,985 | 10/1924 | Spencer | 123/43 R |
| 2,899,945 | 8/1959 | Carvalho | 123/18 A |
| 3,385,272 | 5/1968 | Winogrodzki et al. | 123/18 A |
| 3,516,392 | 6/1970 | Morgan | 123/43 B |
| 3,665,896 | 5/1972 | Crehore | 123/18 A |

*Primary Examiner*—Charles J. Myhre
*Assistant Examiner*—William C. Anderson
*Attorney, Agent, or Firm*—Stanley B. Kita

[57] ABSTRACT

An oscillating piston internal combustion engine comprises a bank of combustion chambers mounted on the front of an engine block for rotation in an annular path to rotate an output shaft protruding from the rear of the block. Gearing inside the block converts oscillating motion of the pistons and cylinders into unidirectional rotation of the output shaft.

10 Claims, 21 Drawing Figures

OSCILLATING PISTON INTERNAL COMBUSTION ENGINE

The present invention relates to internal combustion engines, and more particularly, the present invention relates to internal combustion engines of the oscillating piston type.

In the conventional internal combustion engine, a piston is connected to a crankshaft by a connecting rod. A flywheel is connected to the crankshaft both to smooth the operation of the engine and to store energy during the power stroke to drive the piston in the opposite direction during the exhaust stroke. As the piston moves through bottom dead center substantial inertial forces are induced in the crankshaft, connecting rod, bearing, etc. Although engines are designed to counteract these forces, the noise and vibrations which they generate have not been totally eliminated, even in modern reciprocating-piston engines.

One of the major drawbacks of the conventional reciprocating piston type internal combustion engine resides in the amount of energy required simply to cause the piston to change direction as it moves through bottom dead center at the end of its power stroke. This energy is supplied by the fly-wheel which stores energy during the power stroke of the piston and releases the stored energy to reverse the direction of the piston on the exhaust stroke. Needless to say, an internal combustion engine which does not require this comsumption of energy would be more efficient in operation and hence highly desirable.

Various types of engines employing oscillating pistons and the like have been proposed over the years. Examples of such engines are disclosed in the following U.S. Pat. Nos. 736,151; 1,400,255; 1,094,794; 2,899,945; 3,385,272; 3,516,392; and 3,665,896. Although each of these patented engines may operate satisfactorialy for its intended purpose, none seems to have been used extensively, perhaps because each is relatively complex and not adapted for manufacture on a mass-production basis.

With the foregoing in mind, it is a primary object of the present invention to provide an improved internal combustion engine.

It is another object of the present invention to provide a novel internal combustion engine which operates efficiently.

A still further object of the present invention is to provide a unique oscillating-piston internal combustion engine which is sufficiently simple in construction as to be capable of being mass-produced economically.

As a still further object, the present invention provides a novel gearing arrangement which cooperates with pistons oscillating in rotating chambers to produce a unidirectional output torque in an output shaft.

More specifically, the present invention provides an oscillating-piston internal combustion engine. The engine comprises a bank of combustion chambers rotatable in an annular path on the front of an engine block. An output shaft protrudes from the rear of the block and is connected to the pistons and cylinders composing the bank by gearing means which functions to convert the oscillating motion of the cylinders and pistons into unidirectional rotation of the output shaft. The pistons are driven back and forth in the cylinders by the expansion of burning gases ignited by spark plugs which are mounted at opposite ends of the cylinders and which are energized alternately by an ignition system having comutator means for supplying electrical energy to the plugs in timed relation with the rotation of the combustion chambers. An air-fuel mixture is supplied to the cylinders from a central manifold which is connected to a carburetor. An annular exhaust manifold surrounds the path of movement of the cylinders and receives exhaust gases therefrom. The gearing means includes two gear trains each having a sector gear with alternating major and minor pitch diameters, the major diameter of one sector engaging the minor diameter of the other. The gearing means also includes a differential gear assembly which connects the gear trains to the output shaft. Means is provided to crank the cylinder bank to start the engine by initiating oscillation of the pistons in the cylinders.

These and other objects, features and advantages of the present invention should become apparent from the following description when taken in conjunction with the accompanying drawings, in which.

Figure 1:
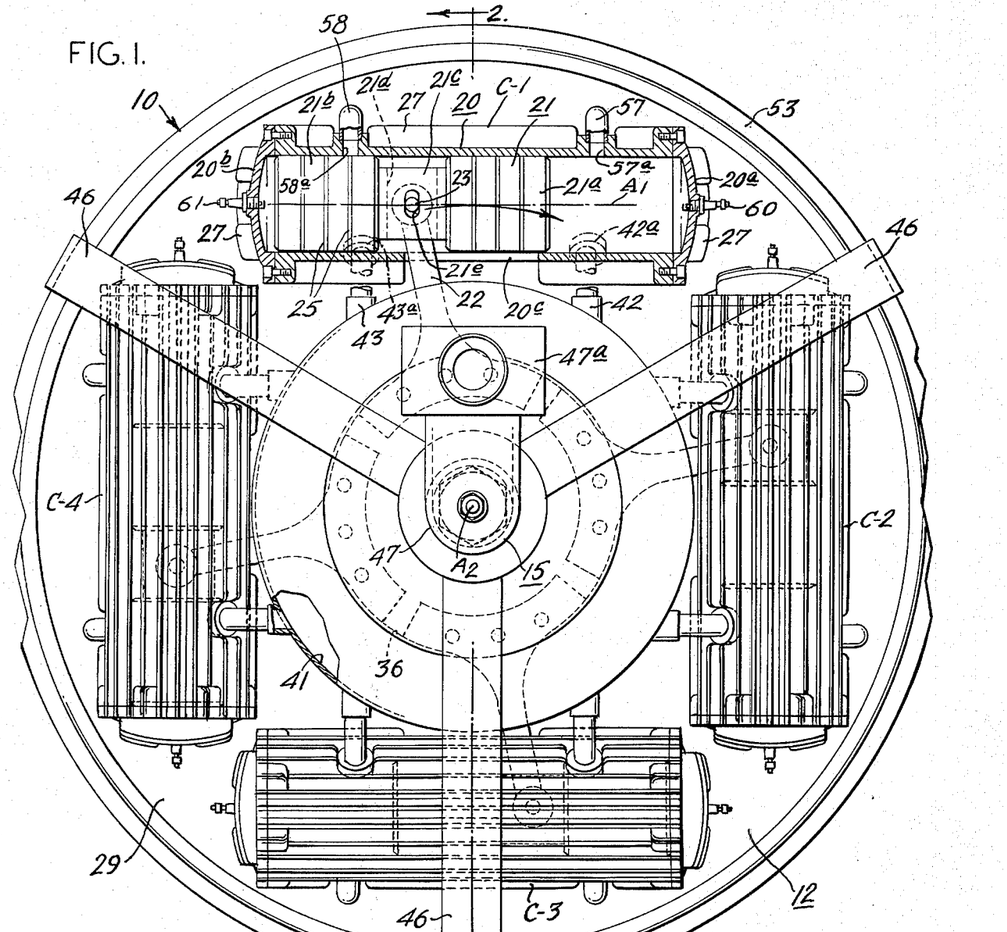
FIG. 1 is a front elevation view of an internal combustion engine embodying the present invention, one of the combustion chambers being broken away to expose certain details of construction.
Figure 2:
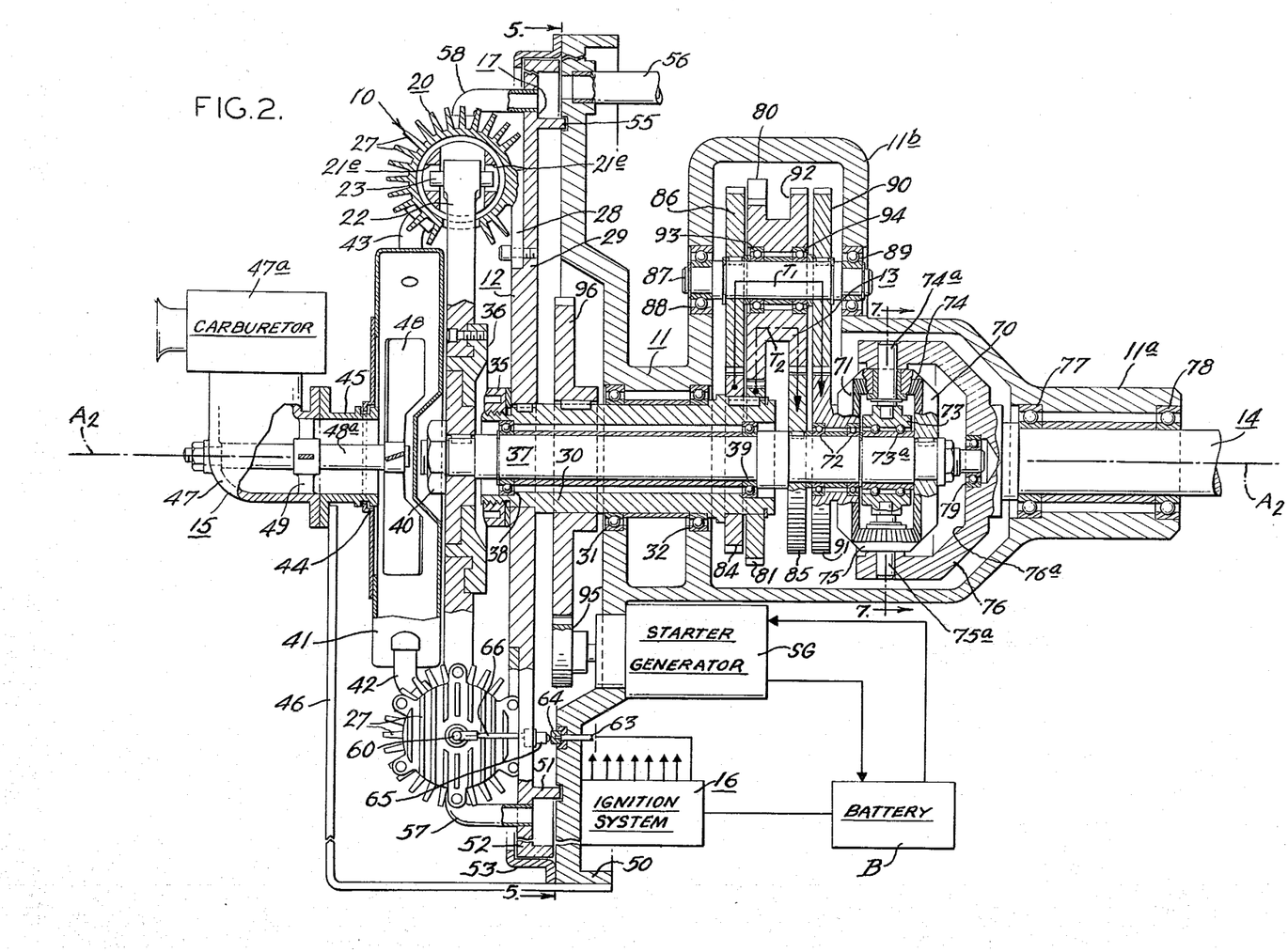
FIG. 2 is a longitudinal sectional view taken along lines 2—2 of FIG. 1.

Referring now to the drawings, FIGS. 1 and 2 illustrate an internal combustion engine which embodies the present invention. In brief, the engine 10 has a two-stroke cycle and comprises an engine block 11, a rotary cylinder bank 12 mounted to the front of the block 11, a gear assembly 13 mounted in the block 11 and connected to the cylinder bank 12, and an output shaft 14 connected to the gear assembly 13. A fuel supply assembly 15 is provided on the front of the engine 10 to admit a combustible fuel-air mixture to the cylinder bank 12. An ignition system 16 is provided to ignite the fuel-air mixture as the cylinder bank 12 rotates. An exhaust manifold assembly 17 receives exhaust gases generated in the cylinder bank 12. The cylinder bank 12 rotates in the clockwise direction (FIG. 1) during combustion of the air-fuel mixture therein to cause the gear assembly 13 to rotate the output shaft 14 in the clockwise direction.

As best seen in FIG. 1, the cylinder bank 12 comprises a series of combustion chambers, in the present instance four in number. The combustion chambers are identified as C-1, C-2, C-3, C-4 in the clockwise direction beginning at the top or twelve o'clock position in FIG. 1. Each combustion chamber is constructed in the same manner as the other, so that for purposes of explanation, reference hereinafter will be made to the top chamber C-1.

The combustion chamber C-1 includes a cylinder 20 and a piston 21 displaceable axially therein. The longitudinal axis $A_1$ of the cylinder 20 is disposed tangential with respect to a circular path about the axis of rotation $A_2$ of the cylinder bank 12. The cylinder of the combustion chamber C-3 is located diametrically opposite the cylinder 20, and the cylinders of the combustion chambers C-2 and C-4 are also located diametrically opposite one another, and at 90° with respect to the chambers C-1 and C-3. Thus, the cylinders travel in a substantially annular or toroidal path of movement about the axis $A_2$ during rotation of the cylinder bank 12 in the direction indicated by the arrow in FIG. 1. When so rotated, the cylinder 20 may be regarded as having a leading end 20a and a trailing end 20b. Fins 27 are provided on each cylinder to dissipate heat as they rotate.

As the cylinder 20 rotates, the piston 21 is driven back and forth between the leading and trailing ends of the cylinder 20 while also rotating about the engine axis $A_2$. To this end, the piston 21 is double-acting and has a leading head end 21a and a trailing head end 21b. The head ends 21a and 21b are connected together by an integral web 21c having a radially-extending slot 21d for receiving a piston connecting rod 22. The connecting rod 22 projects upwardly through an elongated slot 20c in the bottom of the cylinder 20 in registry with the slot 21d in the bottom of the piston-connecting web 21c. The connecting rod 22 is secured to the piston 21 by a hardened pin 23 which is slidable vertically in a pair of aligned slots 21e,21e to afford movement of the pin 23 in an arcuate path while the piston 21 advances in a straight line in the cylinder 20. Of course, each end of the piston 20 is provided with the usual series of oil and compression rings 25,25.

The combustion chambers C-1, C-2, C-3, and C-4 are orthogonal to one another, and each is capable of being removed and replaced in the bank 12. For this purpose, the cylinders, such as the cylinder 20, have depending flanges 28 which are bolted to the front of a circular mounting plate 29 secured to a hollow outer cylinder shaft 30. The cylinder shaft 30 is journalled in the block 11 by axially-spaced low-friction bearings 31 and 32. Preferably, the cylinder-mounting plate 29 is keyed to the shaft 30 and is removably secured thereto by a nut 35 to afford ready mounting and dismounting. Thus, the cylinders rotate in unison about the axis $A_2$ as the plate 29 and the shaft 30 rotate.

The piston connecting rods 22,22 are secured to a hub 36 which is keyed to an inner piston shaft 37 journalled by axially-spaced low-friction bearings 38 and 39 inside the outer shaft 30 which is shorter than the inner shaft 37. The rod hub 36 is secured to the shaft 37 by a nut 40 to afford removal and repair. The rods 22,22 extend outwardly from the hub 36 orthogonal to one another. Thus, the pistons 21,21 are coupled together for movement in unison relative to the cylinders, 20,20.

For the purpose of admitting the combustible air-fuel mixture to the cylinder bank 12, the fuel-supply assembly 15 comprises a hollow intake manifold 41 mounted to rotate with the cylinder bank 12 and conduits 42 and 43 providing gas communication between the interior of the manifold 41 and ports 42a and 43a in the leading end 20a and trailing end 20b of the cylinder 20. The manifold 41 has an axial inlet 44 which is rotatably received by a short pipe 45 fastened to the engine block 11 by a series of three equally-spaced arms 46,46. An L-shaped tube 47 connects the pipe 45 to the carburetor 47a to afford flow of the air-fuel mixture into the manifold 41.

The mixture is pressurized in the manifold 41. To this end, an impeller 48 is mounted in the manifold 41. The impeller 48 has a shaft 48a which extends axially in the pipe 45 and which is supported by a spacer 48a therein. The impeller functions to force the air-fuel mixture radially outward as the cylinder bank assembly 12 rotates on its axis $A_2$. Thus, a supercharging action is effected in the manifold 41 to assist in scavenging the exhaust gases from the combustion chambers C-1, C-2, C-3 and C-4.

In order to convey the exhaust gases from the combustion chambers C-1, C-2, C-3 and C-4, the manifold assembly 17 is located outwardly of the path of movement of the cylinder bank 12. In the illustrated embodiment, the exhaust manifold 17 is annular and is provided between the cylinder mounting plate 29 and a circular bell flange 50 on the front of the engine block 11. As best seen in FIG. 2, the exhaust manifold 17 is defined by a pair of annular flanges 51 and 52 spaced from one another on the plate 29 at its outer periphery. An annular sealing member 53 is fastened to the bell flange 50 and cooperates with the outer flange 52 to provide a labyrinth seal against the escape of exhaust gases from the manifold 17. A suitable seal is also provided between the inner flange 51 and the front of the bell-flange 50, as by causing the flange 51 to travel in an annular recess 55 in the flange 50. An exhaust pipe 56 is threaded to the engine bell flange 50 and communicates with the interior of the exhaust manifold 17. A pair of exhaust conduits 57 and 58 connect the exhaust manifold 17 with ports 57a and 58a in the leading and trailing ends 20a and 20b of the cylinder 20, respectively. It is noted that the axial spacing between the inlet ports 42a and 43a is less than the axial spacing between the outlet ports 57a and 58a in order to provide the desired intake and exhaust functions associated with a two-stroke cycle. Since the exhaust manifold 17 is located outwardly of the path of movement of the cylinder 20,20, centrifugal force is employed to assist in expelling the exhaust gases from the combustion chambers during operation of the engine 10.

The air-fuel mixture is ignited in the combustion chambers as they rotate. To this end, spark plugs 60 and 61 are mounted in the leading end 20a and the trailing end 20b, respectively, of the cylinder 20, and means is provided to energize the spark plugs 60 and 61 in timed relation with rotation of the cylinder bank 12 about the engine axis $A_2$. For example, the cylinder 20 and piston 21 illustrated in FIG. 1 are in a position wherein the trailing spark plug 61 is energized to drive the piston 21 rightward relative to the cylinder 20. In other words, the trailing spark plug 61 is energized when the connecting rod 22 defines an angle of approximately 12° counterclockwise with respect to a vertical line along the line through the engine axis $A_2$. This disposition of the piston 21 and cylinder 20 at the moment of ignition of the trailing spark plug 61 is illustrated schematically in FIG. 3a. The leading spark plug 60, on the other hand, is energized when the piston 21 and cylinder 20 are in the position indicated schematically in FIG. 3d. The trailing spark plug 61 is again energized when the piston 21 and cylinder 20 are in the six-o'clock position indicated schematically in FIG. 3g. Thus, rotation of the cylinder 20 through an included angle of 180° about the engine axis $A_2$ is required in order to effect displacement of the piston 21 from one end of the cylinder 20 to the other and return.

In order to energize the leading and trailing spark plugs 60 and 61 when the cylinders are in a predetermined angular position with respect to the engine axis $A_2$, the ignition system 16 includes means to create high-voltage pulses of electricity. Such means may include a conventional capacitive-discharge circuit well-known in the art. The high-voltage pulses are supplied simultaneously to the trailing spark plugs 61 by wires, such as the wire 63 (FIG. 2). The wires are connected to a series of commutator brushes 64,64 (FIG. 5) spaced apart equidistantly in a circle concentric with the rotation axis $A_2$ of the cylinder bank 12. As best seen in FIG. 2, electrical contact between the commutator brush 64 and the trailing spark plug 61 is provided by a contact element 65 mounted to the cylinder mounting plate 29. The contact element 65 is connected to the spark plug 61 by a wire 66. Although not illustrated, the leading spark plug 60 is similarly connected to a contact which is adapted to receive an electrical pulse from the contactor brushes 67,67 spaced apart equidistantly in a circle located inwardly of the circle in which the trailing plug contactors 64,64 are mounted. The leading plug contactor brushes 67,67 are offset angularly with respect to the trailing plug contactors 64,64. Thus, when the power assembly 12 is in the position illustrated in FIG. 1, the trailing spark plug 61 is provided with an electrical pulse from the contactor brush 64 to ignite the combustible mixture in the trailing end 20b of the cylinder 20. Simultaneously, the trailing spark plugs in each of the other combustion chambers C-2, C-3 and C-4 are energized by the other commutator brushes 64. When the combustion chamber assembly C-1 advances into the position indicated schematically in FIG. 3d, the leading spark plug 60 is energized by an electrical pulse supplied by the commutator brush 67 to ignite the combustible mixture in the leading end 20a of the cylinder 20. Power for the ignition system 16 is supplied by a storage battery B connected to a starter-generator assembly SG in the manner illustrated schematically in FIG. 2.

At the start of the cycle, the piston 21 is disposed in the cylinder 20 with its trailing head end 21b in its leftwardmost limit position and a compressed air-fuel mixture contained in the trailing end 20b of the cylinder 20. Thus, energization of the trailing spark plug 61 ignites the mixture. Since the intake port 42a and the exhaust port 57a associated with the leading end 20a of the cylinder 20 are open to substantially atmospheric pressure, the piston 21 tends to move rightward, and the cylinder 20 tends to move leftward in reaction thereto. As the piston 21 moves rightward relative to the cylinder 20, a fresh-air-fuel mixture is admitted into the leading end 20a of the cylinder 20 and compression thereof is initiated as soon as the leading end 21a of the piston closes off the exhaust port 57a. Of course, some of the mixture is exhausted through the outlet port 57a; however, this effects complete scavenging of the exhaust gases. As the trailing end 21b of the piston 21 moves away from its leftwardmost limit position, the exhaust port 58a is uncovered first to afford escape of exhaust gases into the exhaust manifold 17 before a fresh charge of air and fuel is admitted into the trailing end 20b of the cylinder 20 through the intake port 43a. Thus, the fuel-air mixture is ignited alternately at opposite ends of the combustion chambers C-1, C-2, C-3 and C-4 as they rotate in unison about the engine axis $A_2$.

According to the present invention, the relative movement between the piston 21 and the cylinder 20 as they move apart during expansion of the burning gases in the ends of the cylinders 20 are converted into a unidirectional output torque in the output shaft 14. To this end, the cylinder bank 12 and pistons are connected by means of the shafts 30 and 37 to the gear assembly 13 which also couples the shafts together so that the pistons and cylinders move in a predetermined relation with respect to one another during operation of the engine. For instance, as best seen in FIGS. 3a–3g, the gear assembly 13 is designed to couple the pistons and cylinders in such a manner as to cause the pistons to oscillate through one complete cycle as the cylinders rotate through an arc of 180°. As will be more fully explained hereinafter, the gearing assembly 13 converts the motion of the piston 21 relative to the cylinder during the first half of the cycle (FIGS. 3a–3d) into an output torque and converts the motion of the cylinder 20 relative to the piston 21 during the second half of the cycle (FIGS. 3d–3g) into an output torque. During the first half of the cycle, the piston rod 22 moves through an arc of 102° while the cylinder 20 moves through an arc of 78°. However, during the second half of the cycle, the cylinder 20 moves through an arc of 102° while the piston rod 22 moves through an arc of only 78°. Of course, for one complete revolution of the cylinder bank 12 about its axis $A_2$ each piston 21 oscillates through two complete cycles inside its cylinder 20. As a result, four expansions occur within each cylinder for each revolution of the cylinder bank 12.

Figure 7:
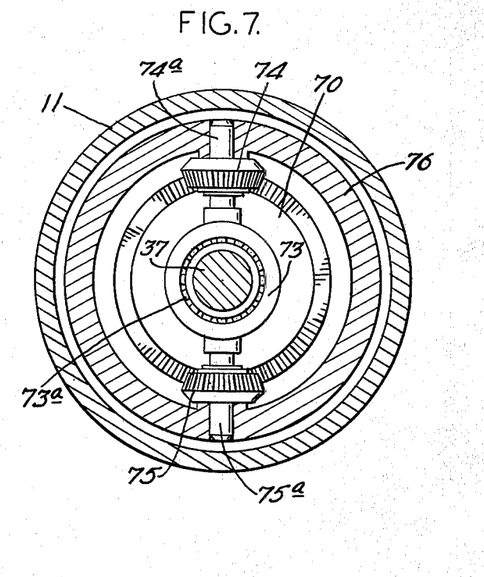
FIG. 7 is a sectional view taken along line 7—7 of FIG. 6.

As best seen in FIG. 2, the gear assembly 13 includes a piston shaft ring gear 70 keyed to the piston shaft 37 near the rear of the block 11. A cylinder shaft ring gear 71 confronts the piston ring gear 70 and is mounted for rotation relative to the piston shaft 37 by a pair of low-friction bearings 72,72. A pair of planetary gears 74 and 75 engage the ring gears 70 and 71, and the planetary gears 74 and 75 are mounted in a recess 76a in the front of a yoke 76 integral with the output shaft 14. As best seen in FIG. 7, the planetary gears are mounted by pintles 74a and 75a, respectively, which protrude radially outward in opposite directions from a collar 73 mounted for rotation on the shaft 37 between the ring gears 70 and 71 by a bearing assembly 73a. The output shaft 14 is mounted by a low-friction bearings 77 and 78 in a rearward protrusion 11a of the engine block 11, and the rear end of the piston shaft 37 is journalled in the yoke 76 by a low-friction bearing assembly 79. With this structure, rotation of the piston ring gear 70 in the clockwise direction (FIG. 1) relative to the cylinder ring gear 71 causes the planetary gears to rotate the yoke 76 in the clockwise direction. Of course, rotation of the cylinder ring gear 71 relative to the piston ring gear 70 causes the yoke 76 also to rotate in the clockwise direction. As will be seen, during the first half of the cycle (FIGS. 3a–3d) the piston ring gear 70 rotates relative to the cylinder ring gear 71 to rotate the output shaft 14; however, during the second half of the cycle (FIGS. 3d–3g) the cylinder ring gear 71 rotates relative to the piston ring gear 70 to rotate the output shaft 14 in the clockwise direction. It is noted that output shaft 14 can overrun the rotational rates of the cylinder and piston shafts to provide an "overdrive" which may be desirable in certain applications.

Figures 3A, 3B, 3C, 3D, 3E, 3F, 3G, 4A, 4B, 4C, 4D, 4E, 4F, 4G, 5:
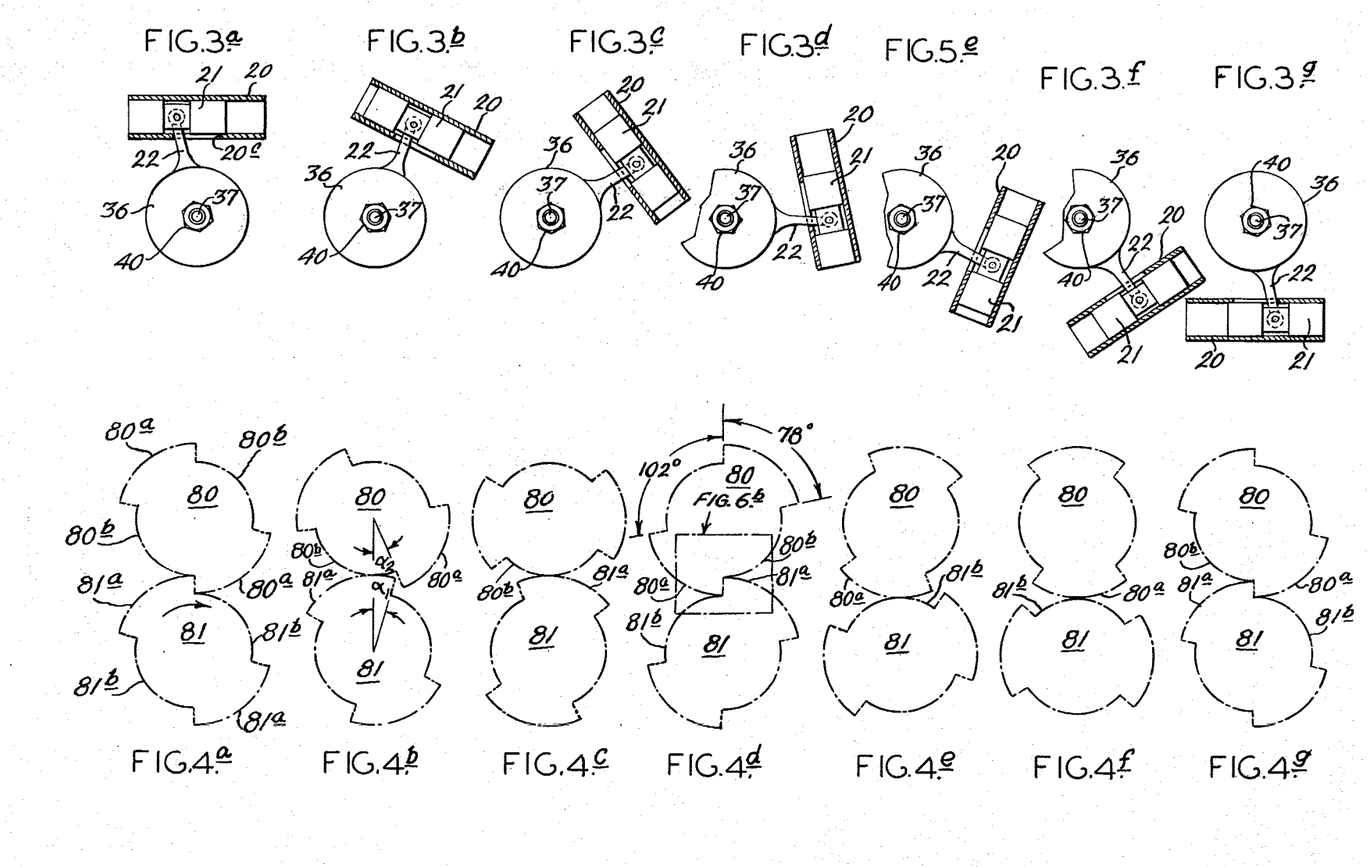
FIGS. 3a–3g are schematic diagrams illustrating the relative positions of a cylinder and piston during one complete cycle of engine operation.
FIGS. 4a–4g are schematic diagrams illustrating the positions of engaged sector gears corresponding to the piston and cylinder positions illustrated schematically in FIGS. 3a–3g.
FIG. 5 is a sectional view in reduced scale taken along lines 5—5 of FIG. 2 to illustrate a portion of the ignition system.
Figure 5:
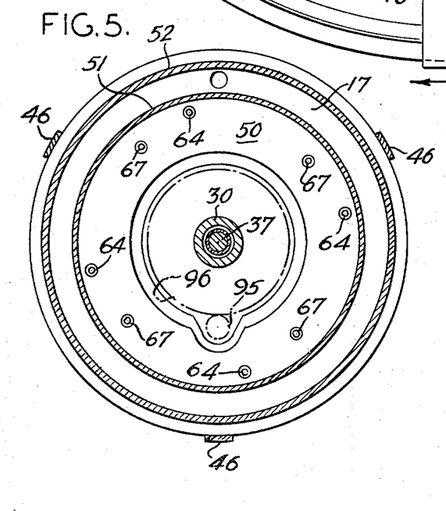

The cylinder ring gear 71 is connected to the cylinder shaft 30 by means of a first gear train $T_1$ indicated by the solid line arrow in FIG. 2. The piston ring gear 70, on the other hand, is connected to the cylinder shaft 30 by a second gear train $T_2$ indicated by the broken line arrow in FIG. 2. The first gear train $T_1$ has a sector gear 80, and the second gear train $T_2$ has a sector gear 81. As best seen in FIG. 4a, each sector gear, such as the sector gear 80 has two diametrically-opposed pairs of tooth arrays 80a,80a and 80b,80b, with the pair 80a alternating with the pair 80b. The pair of tooth arrays 80a are on a larger or major pitch diameter than the pair 80b which are on a smaller or minor pitch diameter. The sector gear 81 has similar opposed pairs of tooth arrays 81a and 81b, the gears 80 and 81 being of the same dimetral pitch to mesh together. As illustrated in FIG. 4a, the minor diameter array of teeth 80b on the upper sector gear 80 engage the major diameter array of teeth 81a of the lower sector gear 81 at the start of the cycle. The minor arrays of teeth 80b and 81b of each gear extend through an arc defined by an included angle of 102°, and the major arrays of teeth 80a and 81a extend through an arc of 78°. It is noted that the angular extent of the minor array 80b and 81b corresponds with the angular movement of the piston connecting rod 22 between the positions indicated schematically in FIGS. 3a–3d. The angular extent of the arrays of teeth 80a and 81a, on the other hand, corresponds with the displacement of the cylinder 20 through an arc of 78° between the position indicated in FIG. 3a and the position indicated in FIG. 3d.

Figure 6A:
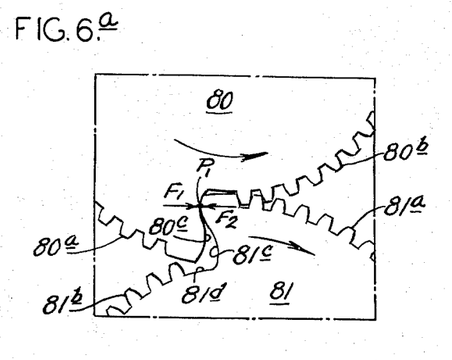
FIGS. 6a–6c are sequential views illustrating force transfers between the sector gears occuring in the area indicated in FIG. 4d.
Figure 6B:
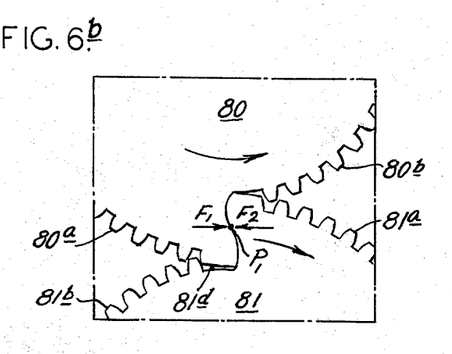
Figure 6C:
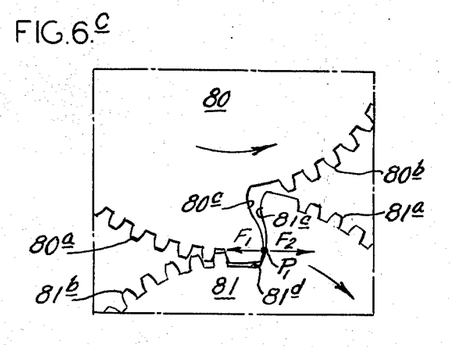

During the first half of the cycle (FIGS. 3a–3d and 4a–4d) the minor array of teeth 80b of the upper sector gear 80 (connected by the gear train $T_2$ with piston input ring gear 70) engages the major array of teeth 81a of the lower sector gear 81 (secured to the cylinder shaft 30). At the end of the first half of the cycle, indicated schematically in FIGS. 3d and 4d, a transition occurs between the sector gears 80 and 81 so that during the second half of the cycle (FIGS. 3d–3g and 4d–4g) the minor array of teeth 80b of the upper sector gear 80 engage the major array of teeth 81a of the lower sector gear 81. At the midpoint of the cycle (FIGS. 3d and 4d) the transition between the engaged teeth occurs as illustrated in FIGS. 6a–6c. As seen therein, the sector gears 80 and 81 provided with surfaces 81c which are designed to transfer points of contact between the pitch diameters smoothly from the major pitch diameter of the sector gear 81 to its minor pitch diameter and to transfer the point of contact smoothly from the minor pitch diameter of the sector gear 80 to its major pitch diameter. As best seen in FIGS. 6a–6c, the surface 80c has an S-shaped configuration, and the surface 81c has a corresponding configuration, and the gear 81 is relieved at 81d between the surface 81c and the first tooth in the array 81b, as is the gear 80. Thus, with this structure, the point of contact $P_1$ between the sector gear 80 and the sector gear 81 moves radially between the surfaces 80c and 81c in the manner illustrated in FIGS. 6a–6c to effect smooth transfer of load from one sector gear to the other. The lower sector gear 81 (keyed to the cylinder shaft 30) rotates in synchronism with the cylinder shaft 30, and the upper sector gear 80 (connected in the gear train $T_2$) rotates in synchronism with the piston shaft 37.

As best seen in FIG. 2, the first gear train $T_1$ includes a first spur gear 84 keyed to the cylinder shaft 30 adjacent the lower sector gear 81. The second gear train $T_2$ includes a second spur gear 85 which is keyed to the piston shaft 37 to rotate therewith. The pitch diameter of the first spur gear 84 in the first gear train $T_1$ and the pitch diameter of the second spur gear 85 in the second gear train $T_2$ are equal and intermediate the major and minor pitch diameters of the sector gears 80 and 81.

The first gear train $T_1$ also includes a pair of spur gears 86 and 90 keyed in axially-spaced relation to a jack shaft 87 journalled for rotation by bearings 88 and 89 in a hollow upward protrusion 11b of the engine block 11. The first gear train $T_1$ also includes a third spur gear 91 which is secured to the cylinder ring gear 71 and which is rotatable relative to the piston shaft 37 with the ring gear 71. The third spur gear 91 meshes with the spur gear 90 in the pair 86 and 90 on the jack shaft 87. The second gear train $T_2$ includes a fourth spur gear 92 rotatable with the upper sector gear 80 relative to the jack shaft 87 by means of a pair of axially-spaced bearings 93 and 94. The fourth spur gear 92 meshes with the second spur gear 85 which is keyed to the piston shaft 37.

In order to start the engine, the starter-generator SG rotates a pinion gear 95 which meshes with a starter spur gear 96 keyed to the cylinder shaft 30. The starter generator SG is supplied with electrical energy from the storage battery B to rotate the pinion 95 for turning the cylinder shaft 30 clockwise (FIG. 1) to crank the engine during starting. Of course, during engine operation, the starter generator SG is driven to supply electrical energy to the battery B.

Before discussing operation of the engine to generate power, description of the movement of the cylinders and pistons and the gears in the gear assembly 13 during cranking of the engine is believed to be helpful in understanding the cooperation of the various elements of the engine.

The starter generator SG rotates the cylinder shaft 30 in the clockwise direction (FIG. 1) during cranking. At the beginning of the cycle, indicated schematically in FIGS. 3a and 4a, it may be seen that the piston 21 is in its leftwardmost limit position in the cylinder 20, and the cylinder 20 is in the twelve o'clock position. At that instant, the cylinder sector gear 81 is engaged with the piston sector gear 80 in the manner illustrated in FIG. 4a. As seen therein, rotation of the cylinder shaft 30 in the clockwise direction causes the sector gear 81 also to rotate in the clockwise direction indicated by the arrow. The major array of teeth 81a on the cylinder sector gear 81 are illustrated at the beginning of their engagement with the minor array of teeth 80b of the piston sector gear 80.

Continued rotation of the cylinder shaft 30 in the clockwise direction through an angle $\alpha_1$ (FIG. 4b) causes the cylinder sector gear 81 to pivot the piston sector gear 80 through an angle $\alpha_2$ which is greater than the angle $\alpha_1$ because the pitch diameter of the array 81b is greater than the pitch diameter of the array 80a. As a result, the spur gear 92 pivots through an angle $\alpha_2$ which in turn causes the spur gear 85 connected to the piston shaft 37 to rotate through the same angle $\alpha_2$ by virtue of the fact that the pitch diameter of the spur gear 92 is the same as the pitch diameter of the spur gear 85. Accordingly, the piston shaft 37 pivots through a greater angle in the clockwise direction than does the cylinder shaft 30, so that as may be seen in FIG. 3b, the piston 21 advances rightward relative to the trailing end of the cylinder 20b as the cylinder 20 pivots clockwise.

This differential angular movement of the cylinder and piston shafts continues in the clockwise direction, so that when the cylinder shaft 30 is further pivoted into the position indicated in FIG. 4c the piston 21 advances further relative to the cylinder 20 as illustrated in FIG. 3c. Continued pivotal movement of the cylinder shaft 30 into the position indicated in FIG. 4d causes the piston 21 to advance into its rightwardmost limit position in the cylinder 20 as indicated in FIG. 3d. At this point, the gear transfer action occurs, and the array of teeth 81b which is on a smaller pitch diameter on the sector gear 81 than the major array of teeth 80a on the sector gear 80 engage one another. As a result, continued clockwise rotation of the cylinder shaft 30 causes the piston shaft 37 to advance through a smaller pivot angle, causing the cylinder 20 to move ahead of the piston 21 as indicated in FIG. 3e. Further rotation of the cylinder shaft 30 into the position indicated in FIG. 4f causes the cylinder 20 to advance further in the clockwise direction than the piston 21 as indicated in FIG. 3f. Of course, when the cylinder shaft 30 pivots into the position indicated in FIG. 4g, the piston has moved to its trailing limit position relative to the cylinder 20, and the cylinder is in the six o'clock position as indicated in FIG. 3g. Thus, in 180° of rotation of the cylinder shaft 30, the piston 21 is displaced from one end of the cylinder to the other to constitute one cycle.

In operation of the engine 10 to generate power, the cylinder bank 12 is cranked with the ignition system 16 on to energize the spark plugs 60 and 61 until proper charges of the air-fuel mixture are admitted into the trailing ends of the cylinders 20,20 and ignited by the spark plugs 61,61 when the cylinders are in the twelve, three, six and nine o'clock positions as indicated in FIG. 1. As the mixtures burn, they expand, causing each piston 21 to move rightward or clockwise and each cylinder 20 to move leftward or counterclockwise. The cylinders 20 torque their shaft 30 counterclockwise and the pistons 21 torque their shaft 37 clockwise. The torque applied to these shafts is equal but opposite in direction.

At the beginning of the cycle, the sector gears are engaged as illustrated in FIG. 4a. That is, the minor array of teeth 80b of the piston sector gear 80 engages the major array of teeth 81a of the cylinder sector gear. Because the piston sector 80 is connected in the gear train $T_2$ it applies to the cylinder sector gear 81 a torque which is opposite in direction to the torque applied by the cylinder shaft 30. However, since the point of engagement of the sector gears 80 and 81 is located closer to the rotational axis of the piston sector 80 than to the cylinder sector 81, the torque applied by the piston sector 80 overcomes the counteracting torque applied by the cylinder sector 81. As a result, the cylinder sector gear 81 is pivoted clockwise, and the spur gear 84 is also pivoted clockwise. The gear 86 in the gear train $T_1$ is thereby rotated in the counterclockwise direction with its companion gear 90, and the gear 90 causes the spur gear 91 to rotate in the clockwise direction relative to the piston shaft 37. The spur gear 91 rotates the cylinder ring gear 71 clockwise relative to the piston ring gear 70, thereby causing the pinion gears 74 and 75 to rotate the yoke 76 to torque the output shaft 14.

This action continues during the first half of the cycle indicated in FIGS. 4a–4d, and 3a–3d. The cylinder gear 71 torques the output shaft 14 until the sector gears 80 and 81 rotate into the position indicated in FIG. 4d. At this point, a transfer action occurs between the sector gears to cause the cylinders 20,20 rather than the pistons 21,21 to torque the output shaft 14. To this end, the sector gears 80 and 81 are designed so that the point of contact $P_1$ (FIGS. 6a–6c) between them moves downwardly so that the lines of action of the forces $F_1$ and $F_2$ are transferred from a location closer to the rotational axis of the piston sector gear 80 to a location closer to the rotational axis of the cylinder sector gear 81. This action occurs when the cylinder and piston are in the position indicated in FIG. 3d and the mixture is ignited in the trailing ends of the cylinders, the instant of ignition occuring as the point $P_1$ moves into a position closer to the rotational axis of the cylinder sector gear 81. Expansion of the burning mixture causes each piston 21 to move counterclockwise and each cylinder 20 to move clockwise. This causes the force $F_2$ to change direction, as does its reaction force $F_1$. Since the force $F_2$ is greater than the force $F_1$, the piston sector gear 80 is pivoted in the counterclockwise direction by the cylinder sector gear 81. The piston sector gear 80 rotates through an angle corresponding to the angle through which its companion spur gear 92 rotates. The angle, of course, is less than the angle through which the cylinder sector gear 81 rotates; however, because the spur gear 85 meshes with the spur gear 92 at a location spaced radially outward of the rotational axis of the cylinder sector 81 a distance greater than the corresponding radial location of the minor array of teeth 81b, the piston shaft 37 rotates through a greater angle than the cylinder shaft 30. Accordingly, the piston ring gear 70 keyed to the piston shaft 37 rotates relative to the cylinder ring gear 71 and causes the planetary gears 74 and 75 to rotate the yoke 76 also in the clockwise direction to torque the output shaft 14 during the period of the cycle indicated in FIGS. 4e and rf corresponding to the movement of the piston 21 and cylinder 20 in the positions indicated in FIGS. 3e and 3f.

The application of torque by the cylinders to the output shaft 14 terminates when the cylinder 20 reaches the six o'clock position illustrated in FIG. 3g and the piston 21 reaches its rightwardmost or trailing limit position. At this point of time, the sector gears 80 and 81 again effect transfer of the forces along the surfaces 80c and 81c in the direction opposite the direction in which the transfer was effected in FIGS. 6a–6c. Of course, the cycle is repeated as the cylinder 20 continues to rotate from the six o'clock position to the 12 o'clock position so that in one complete rotation of the cylinder bank 12 about its axis $A_2$ two complete power cycles are effected.

In summary, the greater movement of the pistons relative to the cylinders during the first part of the cycle causes the gear assembly 13 to torque to the output shaft 14, and the greater movement of the cylinders relative to the pistons during the second half of the cycle causes the gear assembly 13 to torque the output shaft 14. It is noted that the cylinders and pistons are continuously moving in the clockwise direction (FIG. 1); however, the rates at which they move relative to one another vary so that the pistons may be regarded as oscillating relative to the cylinders or vice versa. Since the pistons do not change directions, a significant amount of energy is saved resulting in an efficient internal combustion engine.

The illustrated internal combustion engine employs the well-known two-stroke cycle; however, it should be understood that an engine utilizing a four-stroke cycle and embodying the present invention may be provided. The two-stroke cycle has the advantage of being simpler in construction and is preferable from that standpoint. If desired, the commutators 64 and 67 may be mounted on rings moveable angularly relative to the engine axis $A_2$ in order to advance or retard the spark. Such movement may be effected manually or by automatic spark advance mechanisms well-known in the art. Automatic spark advance mechanisms may be operated directly from the output shaft 14 to advance the spark as the rotational velocity of the output shaft 14 increases.

In view of the foregoing, it should be apparent that the present invention provides an improved internal combustion engine which operates efficiently by employing oscillating pistons and cylinders. The engine is relatively simple in construction, and is therefore capable of being mass-produced and maintained economically. Moreover, the engine is relatively compact, and this affords installation in vehicles where spatial limitations exist.

Thus, while a preferred embodiment of the present invention has been described in detail, various modifications, alterations, or changes may be made without departing from the spirit and scope of the present invention as defined in the appended claims.

What is claimed is:

1. An internal combustion engine, comprising:
   an engine block,
   at least one pair of cylinders mounted in tangentially-opposed relation on diametrically opposite sides of an axis through the block,
   means mounting said cylinders for rotation in a bank in unison in a substantially annular path about said axis with one end of each cylinder leading and the other end trailing,
   a double-acting piston displaceable axially in each cylinder between opposite ends thereof,
   means mounting said pistons for axial movement in said cylinders and for rotation in unison about said axis,
   means for alternately admitting a combustible mixture to the leading ends and to the trailing ends of the cylinders,
   means for igniting said combustible mixtures in timed relation with the rotation of the cylinders about said axis,
   means for exhausting the ignited mixture from said cylinders as they rotate about said axis,
   an output shaft journalled in said engine block, and
   gearing means in said engine block directly connecting said cylinder mounting means and said piston mounting means together and to said output shaft for affording controlled relative motion between the pistons and the cylinders and for converting said relative motion into unidirectional rotation of said output shaft said gearing means including a differential gear assembly having a pair of input ring gears rotatable relative to one another, a pair of output planetary gears engaging said ring gears, and a yoke connected to said output shaft and rotatably mounting said planetary gears, a first gear train connecting one of said input ring gears to said cylinder mounting means, a second gear train connecting the other of said input ring gears to said piston mounting means, one of said gear trains including a complementary pair of sector gears interengaged with one another, one of said pair of sector gears being rotatable in synchronism with said cylinder mounting means and the other of said pair of sector gears being rotatable in synchronism with said piston mounting means, whereby the sector gears cooperate with the gear trains to impart unidirectional output torque to said output shaft.

2. An engine according to claim 1 wherein each sector gear has diametrically-opposed arrays of teeth disposed in alternate pairs with one pair having a minor pitch diameter and the other pair having a major pitch diameter, said sector gears being engaged so that a minor array of teeth on one sector gear engages a major array of teeth on the other sector gear; and wherein said first gear train includes a first spur gear rotatable in synchronism with said one sector gear and said second gear train including a second spur gear rotatable in synchronism with said other sector gear, said first and second spur gears having the same pitch diameter which is intermediate said major and minor pitch diameters of said sector gears.

3. An engine according to claim 2 wherein the major array on each sector gear has an arcuate extent less than the arcuate extent of the minor array thereof, and wherein the sector gears have complimentary contact surface means connecting the major and minor tooth arrays to afford a smooth transfer of load from the minor array of teeth on one sector to the minor array of teeth on the other sector.

4. An engine according to claim 2 wherein said cylinder mounting means includes a hollow outer shaft journalled in said block and a plate mounted on said shaft for carrying said cylinders; and wherein said piston mounting means includes an inner shaft journalled coaxially within said hollow shaft for rotation relative thereto, and a series of rods connecting said pistons to said inner shaft, said one sector gear and said first spur gear being secured to said outer shaft, and said second spur gear being connected to said inner shaft.

5. An engine according to claim 4 wherein said first gear train also includes a jack shaft journalled in said block for rotation about an axis parallel with said first-mentioned axis, a pair of axially-spaced spur gears secured to said jack shaft for rotation in unison, a third spur gear connected to one of said pair of input ring gears, one of said pair of axially-spaced spur gears engaging said first spur gear and the other of said pair of axially-spaced spur gears engaging said third spur gear.

6. An engine according to claim 5 wherein said second gear train includes a fourth spur gear mounted to said jack shaft for rotation relative thereto and engaged with said second spur gear, said second sector gear being mounted to said jack shaft for rotation relative thereto with said fourth spur gear, said inner shaft being rotatably received by said one ring gear and being secured to said other input ring gear.

7. An engine according to claim 1 including a starter gear connected to said cylinder mounting means, and starter means connected to said starter gear for rotating the cylinders during starting of said engine.

8. An engine according to claim 1 wherein said mixture admitting means includes an intake manifold mounted to rotate with said cylinders, means providing a stationary axial inlet to said intake, carburetor means connected to said manifold inlet, conduit means providing communication between said manifold and the ends of each cylinder to admit said combustible mixture thereinto, and stationary impeller means mounted in said intake manifold for flowing said combustible mixture outwardly as said cylinders and manifold rotate, whereby the mixture is pressurized in said manifold and flowed under pressure into said cylinders.

9. An engine according to claim 1 wherein said igniting means includes a spark plug mounted at each end of each cylinder, commutator means for each plug mounted on said block in an annular array at spaced locations alongside the path of movement of said cylinders, means connecting said commutator means to a high-voltage source of electrical energy, and contact means connected to said spark plugs and adapted to transfer electrical energy from said commutator means to said spark plugs as said cylinders rotate.

10. An engine according to claim 1 wherein said exhausting means includes an annular exhaust manifold surrounding the path of movement of said cylinders, means connecting said cylinders to said exhaust manifold, and an exhaust pipe opening into said exhaust manifold for conducting exhaust gases therefrom, whereby centrifugal forces assist in flowing exhaust gases out of said cylinders.

* * * * *